United States Patent [19]

Sakamoto et al.

[11] Patent Number: 5,705,017
[45] Date of Patent: Jan. 6, 1998

[54] METHOD FOR THE PRODUCTION OF STEEL SHEET COATED WITH A FLUORORESIN FILM

[75] Inventors: Yasuhei Sakamoto; Toshio Irie; Hideshi Fujisawa; Koji Seto; Morimasa Kuroda, all of Chiba, Japan

[73] Assignee: Kawatetsu Galvanizing Co., Ltd., Tokyo, Japan

[21] Appl. No.: 549,789

[22] PCT Filed: Jun. 9, 1994

[86] PCT No.: PCT/JP94/00938

§ 371 Date: Dec. 5, 1995

§ 102(e) Date: Dec. 5, 1995

[87] PCT Pub. No.: WO94/29101

PCT Pub. Date: Dec. 22, 1994

[30] Foreign Application Priority Data

Jun. 10, 1993 [JP] Japan ................. 5-138770
Nov. 1, 1993 [JP] Japan ................. 5-273504

[51] Int. Cl.⁶ .................... C09J 5/02; C09J 5/06
[52] U.S. Cl. ............ 156/309.3; 156/321; 156/322; 156/324; 427/318; 427/366; 427/379; 427/388.1; 427/409
[58] Field of Search ............... 427/359, 365, 427/366, 318, 388.1, 409, 379; 156/321, 322, 324, 309.3

[56] References Cited

U.S. PATENT DOCUMENTS 4,258,089  3/1981  Anderson et al. .............. 427/318
5,178,915  1/1993  Moyle et al. .................. 427/318

FOREIGN PATENT DOCUMENTS

| 5424434 | 8/1979 | Japan . |
|---|---|---|
| 57-22750 | 5/1982 | Japan . |
| 58-58227 | 12/1983 | Japan . |
| 5910304 | 3/1984 | Japan . |
| 5916836 | 4/1984 | Japan . |
| 5916837 | 4/1984 | Japan . |
| 61-137534 | 6/1986 | Japan . |
| 61-138567 | 6/1986 | Japan . |
| 63-11147 | 3/1988 | Japan . |
| 63-126728 | 5/1988 | Japan . |
| 63-168333 | 7/1988 | Japan . |
| 224134 | 1/1990 | Japan . |
| 260509 | 12/1990 | Japan . |
| 3112647 | 5/1991 | Japan . |
| 4135842 | 5/1992 | Japan . |
| 4135843 | 5/1992 | Japan . |
| 4201237 | 7/1992 | Japan . |
| 4334443 | 11/1992 | Japan . |
| 5162243 | 6/1993 | Japan . |

*Primary Examiner*—Erma Cameron
*Attorney, Agent, or Firm*—Greenblum & Bernstein, P.L.C.

[57] ABSTRACT

A method of producing a steel sheet coated with a fluororesin film by heat-fusing the fluororesin film onto a surface of the steel sheet, comprising heating the surface of the steel sheet to a temperature higher by 30–120 degrees C. than a melting point of the fluororesin of the fluororesin film, and contact bonding the fluororesin film onto the steel sheet surface between a pair of rolls, while a surface of a roll facing the fluororesin film, in the pair of rolls, is heated to a temperature lower by 100–210 degrees C. than the melting point of the fluororesin of the fluororesin film.

11 Claims, 1 Drawing Sheet

METHOD FOR THE PRODUCTION OF STEEL SHEET COATED WITH A FLUORORESIN FILM

BACKGROUND OF THE INVENTION

1. Field of the Invention

This invention relates to a method for the production of a steel sheet coated with a fluororesin film, and more particularly proposes a technique for strongly applying a fluororesin film containing fluorine atom therein onto a surface of a steel sheet.

2. Background and Related Art

In general, the fluororesin is excellent in the properties such as corrosion resistance, stain resistance, adhesion resistance, heat resistance, incombustibility and the like. Therefore, if a stainless sheet or the like can firmly be covered with a film of this fluororesin, the resulting coated steel sheet possesses both the above properties inherent to the film and the properties inherent to the stainless steel (strength and workability).

The steel sheets coated with the fluororesin film having the above properties can widely be applied to a toasting mold for baking breads, cakes, confectioneries and the like, food cooking tools and food working tools, heating cook tools such as an inner plate of a microwave oven, an inner pot of a rice cooker, a top plate of a gas table and the like and further kitchen tool materials such as material for oven hood and so on. Therefore, it is desired to establish a technique for industrially producing the above steel sheets.

In this connection, materials obtained by coating stainless steel sheet or plated steel sheet with a fluororesin have hitherto been disclosed in JP-A-61-137534, JP-A-61-138567 and JP-B-63-11147. In JP-B-59-16836 and JP-B-59-16837 are disclosed materials obtained by coating Al-plated steel sheet with a fluororesin. In JP-B-54-24434, JP-B-59-10304 and JP-A-63-126728 are disclosed materials obtained by coating Al or Al alloy body with a fluororesin film. In JP-A-63-168333 is disclosed a method of coating a steel sheet with a fluororesin film through a thermosetting adhesive.

According to these conventional techniques, however, the coating by means of the adhesive is difficult to achieve and also the strong covering is difficult because the fluororesin film has low surface tension and hence a strong non-adhesion property. Particularly, there has not yet been developed an effective method of strongly applying onto the surface of the steel sheet with respect to fluororesin films containing two or more fluorine atoms per one molecule unit such as ethylene tetrafluoride-perfluoroalkylvinyl ether copolymer resin (PFA), ethylene tetrafluoride-propylene hexafluoride copolymer resin (FEP) and ethylene tetrafluoride-ethylene copolymer resin (ETFE) up to the present, so that the practical use of these films is actually delayed.

In this point, the inventors have already proposed in JP-A-5-162243 a method wherein a mixture of fluororesin and heat-resistant resin is previously applied onto a surface of aluminum plated steel sheet, zinc alloying plated steel sheet or stainless steel sheet and a resin film of the same kind is applied thereon and pressed through rolls, during which the interface between the film and the steel sheet is heated to a temperature just above a melting point of the film to weld to the undercoat resin layer.

However, this technique adopts a simple method of conducting heat pressing only by single heating, so that there are problems that the adhesion force between the film and the steel sheet becomes insufficient and that melt-breaking of the film and poor adhesion are caused because only the surface temperature of the steel sheet is controlled.

It is a main object of the invention to adhere a fluororesin film containing two or more fluorine atoms per one molecule unit and having a poor adhesion property onto a surface of a stainless steel sheets or the like at a high adhesion force.

It is another object of the invention to adhere continuously through roll pressing a fluororesin film containing two or more fluorine atoms per one molecule unit onto a surface of a metal without causing melt breakage and poor adhesion.

SUMMARY OF THE INVENTION

As a method for achieving the object of the invention, in view of the problem of the conventional technique that the melt breakage or poor adhesion of the film is brought about as the temperature of press roll becomes too low or high, the invention proposes a method of producing a steel sheet coated with a fluororesin film by heat-fusing the fluororesin film onto a surface of the steel sheet, characterized in that a surface of the steel sheet to be adhered with the fluororesin film is previously adjusted by heating to a temperature higher by 30°–120° C. than the melting point of the fluororesin, while a surface of a roll facing the film in a pair of rolls for contact-bonding the resin film onto the steel sheet surface is adjusted to a temperature lower by 100–210° C. than the melting point of the fluororesin.

In this method, it is preferable that a primer comprised of a mixed resin of fluororesin and thermal-resistant resin is previously applied onto the surface of the steel sheet at a thickness of 3–15 g/m² as a weight after the drying prior to the contact-bonding of the fluororesin film to the steel sheet.

Furthermore, it is preferable that at least one heating among the steel sheet surface heating, the heating of primer-treated steel sheet surface and the roll surface heating is carried out by induction heating.

DETAILED DESCRIPTION OF THE INVENTION

Figure 1:
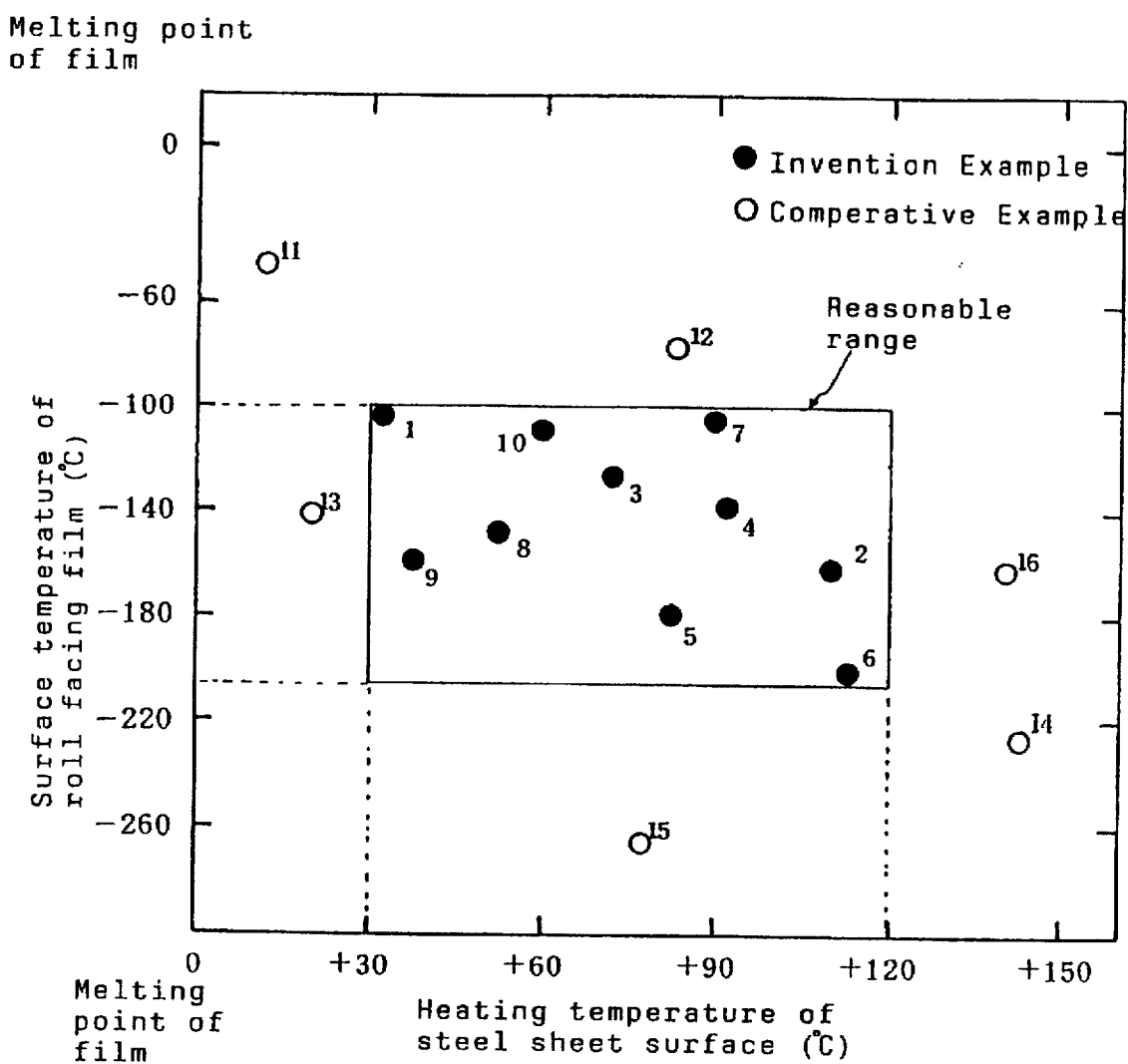
FIG. 1 is a graph showing heat-fusion conditions (based on a melting point of a film) in Examples of the invention.

The method of the invention is characterized by the regulation of both temperatures, the steel sheet surface temperature and the surface temperature of the roll for pressing, without directing attention only to the regulation of the former. Thus, the resin film is contact-bonded at a fused state only in an interface to the steel sheet, so that the fluororesin film can continuously and stably be adhered to the surface of the steel sheet without bringing about the melt breakage and poor adhesion.

The method of the invention will be described in detail below.

In the method of the invention, it is required to adjust previously the surface of the steel sheet (the primer-treated steel sheet in case of the primer treatment) to be coated with the resin film by heating to a temperature higher by 30°–120° C. than the melting point of the fluororesin just before the roll pressing at a state of piling the fluororesin film onto the surface of the steel sheet. For example, it is necessary to heat the steel sheet to 340°–430° C. in case of PFA resin film having a melting point of 310° C. or 300°–390° C. in case of FEP resin film having a melting point of 270° C.

The reason why the surface temperature of the steel sheet is adjusted to the above range is due to the fact that when the temperature of the surface to be coated with the film does not reach a temperature higher by 30° C. than the melting point of the fluororesin, the surface of the fluororesin film to be applied is not fused and hence the adhesion between the film and the steel sheet surface or between the film and the primer becomes insufficient. On the other hand, when the surface temperature exceeds a temperature higher by 120° C. than the melting point of the fluororesin, the film itself is melted and broken in the contact-bonding, or the possibility of degrading the adhesion property through thermal decomposition of the primer resin in case of the primer is foreseen.

When the fluororesin film is contact-bonded to the thus temperature-adjusted steel sheet surface through a pair of rolls, it is required to adjust the surface of the roll facing the film to a temperature lower by 100°–210° C. than the melting point of the fluororesin.

The reason why the surface temperature of the roll facing the film in the contact-bonding is adjusted to the above range is due to the fact that when the roll surface temperature exceeds a temperature lower by 100° C. than the melting point of the fluororesin, the cooling of the film surface is lacking and the film is at a molten state to cause a risk of melt-breaking the film, while when the roll surface temperature is less than a temperature lower by 210° C. than the melting point of the fluororesin, the film is rapidly cooled and the interface to the film is not fused to cause the poor adhesion.

Moreover, the surface temperature of the roll facing the steel sheet which does not directly contact with the film is not particularly restricted, but it is desirable that the temperature is kept in the range between the temperature by 100° C. lower than the melting point of fluoro-resin film and that by 50° C. higher than the melting point of the fluororesin.

In this method, rubber rolls or the like having good wettability to the steel sheet surface and elasticity are favorably used as a pair of rolls for the contact-bonding. As a result, the rolls made from such a material are degraded by heat from the steel sheet, so that it is important that the roll itself should be avoided to use at a temperature not lower than 300° C. and is adequately cooled to maintain a level of not higher than 210° C.

In the method of the invention, as mentioned above, what extent the surface temperature of the steel sheet or the like is selected within the above range is controlled by the type and thickness of the film, surface temperature of the roll for contact-bonding and the like. For example, when the steel sheet or the primer-treated steel sheet is heated by passing through a tunnel furnace and thereafter taken out from the furnace and the film is pressed through the rolls, it is required to heat it to a higher temperature previously, anticipating a temperature drop. According to experience, the temperature drop is dependent upon factors such as sheet thickness, sheet passing rate, distance between furnace and press roll and the like, but is usually 10°–50° C., so that it is important to conduct the extra heating including the drop quantity.

In the method of the invention, the heating of the steel sheet may be usually carried out by using a hot air type tunnel furnace, but is preferably conducted by using an electromagnetic induction heating furnace. Because, in case of the electromagnetic induction heating, only the interface (adhesion surface) between the steel sheet and the film may sufficiently be heated to improve the adhesion property of the film. Furthermore, when the primer is used, the primer is heated from the inside (steel sheet side) and the solvent residual quantity is comparatively small after heating.

In the method of the invention, the fluororesin film-coated steel sheet is then cooled by slow cooling in air or quenching with water, and the influence upon the adhesion strength can be ignored irrespective of cooling methods.

In the method of the invention, galvanized steel sheet, hot dip zinc-5% aluminum alloy plated steel sheet, hot dip galvannealed steel sheet, zinc-nickel alloy plated steel sheet, hot dip aluminum plated steel sheet, hot dip aluminum-silicon alloy plated steel sheet, 55% aluminum-zinc alloy plated steel sheet, stainless steel sheet or the like is preferably used as the steel sheet substrate.

These steel sheets are favorable to have a thickness of about 0.2–1.6 mm, while the type thereof is not particularly restricted and is selected in accordance with use purpose. For instance, aluminum plated steel sheet and stainless steel sheet are suitable to the applications requiring high thermal resistance such as a top plate for a gas cooking stove and the like.

Furthermore, in order to obtain a high film adhesion property in case of fluororesin film having a high melting point such as PFA, the steel sheet surface is heated to be a high temperature of about 400° C. so that the galvanized steel sheet and the like are not suitable for such a requirement because the plated layer is molten.

As the fluororesin film covering the above steel sheet material in the method of the invention, fluororesin films containing 2 or more fluorine atoms per 1 molecule unit and having a poor adhesion property, which include, for example, films of thermoplastic resins such as ethylene tetrafluoride-perfluoroalkylvinyl ether copolymer resin (PFA), ethylene tetrafluoride-propylene hexafluoride copolymer resin (FEP) and ethylene tetrafluoride-ethylene copolymer resin (ETFE) are effectively used.

The thickness of the fluororesin film is not particularly restricted, but is preferably 10–100 μm.

Moreover, these films are naturally colorless and transparent, but there may similarly be utilized films subjected to any treatment, e.g. film containing pigment powder for coloring, film containing additives for imparting functionality and the like.

In the method of the invention, if necessary, an under coat treatment of a metal is carried out prior to the adjustment of the steel sheet surface by heating. The under coat treatment is desirable to be carried out by the application of the primer.

In addition to the application of the primer, the under coat treatment may be conducted by the other pretreatment such as a general method in which the steel sheet is polished by shot burst or wire blushing and then subjected to pickling or electrolytic etching, or a roll-on type chromate treatment. In case of the stainless steel sheet, when the sheet is subjected to the roll-on type chromate treatment and further primer treatment instead of the mere primer treatment, the film adhesion strength, thermal resistance and durability are considerably improved.

As the primer for the under coating the steel sheet matrix, use may be preferably made of aqueous solution or organic solution of primers each comprised of a mixed resin of fluororesin powder selected from the group consisting of polyethylene tetrafluoride (PTFE), ethylene tetrafluoride-perfluoroalkylvinyl ether copolymer resin (PFA), ethylene tetrafluoride-propylene hexafluoride copolymer resin (FEP), ethylene tetrafluoride-ethylene copolymer resin (ETFE), chlorotrifluoroethylene, polyvinylidene fluoride and the like and a heat-resistant resin selected from the group consisting of polyether sulfone (PES), polyphenylene sulfide (PPS), polyimide, polyamideimide, epoxy resin, silicone resin, phenolic resin and the like.

The mixing ratio of the fluororesin powder to heat-resistant resin is preferably within a range of 1:99–95:5 by weight ratio.

The thickness of the primer is favorably 3–15 g/m² after the drying. When it is less than 3 g/m², the effect on improving the adhesion strength as the primer is poor, while when it exceeds 15 g/m², the effect is saturated and also there is a possibility of lowering the film adhesion property in the working or of creating blister of the primer due to remaining gas in the primer.

The examples according to the invention will be described as compared with comparative examples.

EXAMPLE 1

A fluororesin film is heat-fused to each of steel sheets treated with primer having different resin compositions shown in Table 1 under various conditions to produce a steel sheet coated with the fluororesin film (see FIG. 1).

The primary adhesion property of the thus fluororesin film coated steel sheet are evaluated to obtain results as shown in Table 2.

TABLE 1

| No | Material Kind *1 | Under coating conditions Roll-on type chromate treatment *2 | Resin composition | Resin baking method *3 | Heat-fusing conditions (°C.) Heating temperature of steel sheet (°C.) | Temperature of roll facing the film (°C.) | Film Melting point of film (°C.) | Kind of film | Remarks |
|---|---|---|---|---|---|---|---|---|---|
| 1 | ① | absence | PFA:1 | A | 340 | 208 | 308 | PFA | Invention |
| 2 | ① | presence | PES:2 | A | 380 | 120 | 270 | FEP | Example |
| 3 | ② | absence | PPS:1 | A + B | 380 | 180 | 308 | PFA | |
| 4 | ③ | absence | — | A | 400 | 170 | 308 | PFA | |
| 5 | ③ | presence | FEP:1 | A | 390 | 130 | 308 | PFA | |
| 6 | ③ | presence | PES:2 | A | 420 | 108 | 308 | PFA | |
| 7 | ③ | presence | — | A | 360 | 165 | 270 | FEP | |
| 8 | ③ | presence | — | A | 360 | 150 | 308 | PFA | |
| 9 | ③ | presence | — | B | 350 | 160 | 308 | PFA | |
| 10 | ③ | presence | — | B | 330 | 160 | 270 | FEP | |
| 11 | ① | absence | PFA:1 | A | 320 | 260 | 308 | PFA | Comparative |
| 12 | ② | absence | PES:2 | A | 390 | 240 | 308 | PFA | Example |
| 13 | ③ | presence | PPS:1 | A | 290 | 130 | 270 | FEP | |
| 14 | ③ | presence | — | B | 450 | 80 | 308 | PFA | |
| 15 | ③ | presence | — | B | 380 | 40 | 308 | PFA | |
| 16 | ③ | presence | — | B | 410 | 110 | 265 | ETFE | |

*1: ①: 55% Al—Zn plated steel sheet, thickness 0.6 mm, plated amount AZ150 ②: hot-dip Al—Si alloy plated steel, thickness 0.6 mm, plated amount 40 g/m² (one-side) ③: SUS430 stainless steel sheet, thickness 0.6 mm
*2: Roll-on type chromate solution ZM-DS-1300AN, made by Japan Parkerizing Co., Ltd.
*3: A: induction heating B: hot air heating

TABLE 2

| No. | Film adhesion property | Remarks |
|---|---|---|
| 1 | 5 | Invention |
| 2 | 5 | Example |
| 3 | 5 | |
| 4 | 5 | |
| 5 | 5 | |

TABLE 2-continued

| No. | Film adhesion property | Remarks |
|---|---|---|
| 6 | 5 | |
| 7 | 5 | |
| 8 | 5 | |
| 9 | 4 | |
| 10 | 4 | |
| 11 | 2 | Comparative |
| 12 | 4 * 1 | ative |
| 13 | 1 | Example |
| 14 | 3 * 1 | |
| 15 | 1 | |
| 16 | 2 | |

* 1: Melt breakage of film is created in the adhesion of film. The production stability is less.

Moreover, as the heat pressing conditions of the fluororesin film in No. 1–10 and No. 11–16 of Example 1, the temperature of the press roll facing the steel sheet is 150°–250° C. and line pressure of the roll is 0.3 kg/cm. And also, the roll-on type chromate treating weight is 30 mg/m² and the chromate coating is dried at 150° C. for 30 seconds.

Further, the test method and evaluating method for the adhesion property in the above example are conducted under the following conditions.

[Test for adhesion property]

It is carried out according to #-type Erichsen test method of JIS Z6744. Three test specimens used in the #-type Erichsen test method are provided by previously immersing two specimens in a boiling water for 1 or 2 hours and then drying in air for 30 minutes or without immersion in the boiling water. Each of #-type portion of these specimens is pushed out by 6 mm with Erichsen testing machine, and then the cut surface of the pushed film portion is floated by means of a knife and the film is forcedly peeled off therefrom by means of tweezers.

The evaluation standard is shown in Table 3, in which the case of not floating all of three specimens is 5 evaluation point.

TABLE 3

|  |  | Immersing time in boiling water | | |
|---|---|---|---|---|
|  |  | No immersion | 1 hour | 2 hours |
| Evaluation point | 5 | o | o | o |
|  | 4 | o | o | Δ |
|  | 3 | o | Δ | x |
|  | 2 | o | x | x |
|  | 1 | x | x | x | o: No float of film
Δ: Film is floated but can not be peeled off
x: Film is floated and peeled off As seen from the results of Table 2, all of the fluororesin film coated steel sheets produced by the method of the invention are excellent in the film adhesion property as compared with those of the fluororesin film coated steel sheets according to the comparative examples. Furthermore, according to the method of the invention, the fluororesin film coated steel sheets can be produced continuously without creating the melt breakage of the film in the pressing of the resin film.

INDUSTRIAL APPLICABILITY

As mentioned above, according to the method of the invention, the fluororesin film containing 2 or more fluorine atoms per 1 molecule unit can be adhered strongly onto the surface of the steel sheet, and also the fluororesin film coated steel sheets having an excellent adhesion property can be produced continuously and economically.

Therefore, the fluororesin film coated steel sheets according to the invention are applicable to not only materials for cooking tools, kitchen tools, an inner plate of a microwave oven and a top plate of a gas table but also materials for electron parts, printed circuit boards and the like and can be supplied as a cheap and excellent material suitable for wide applications.

We claim:

1. A method of producing a steel sheet coated with a fluororesin film by heat-fusing the fluororesin film onto a surface of the steel sheet, comprising:

heating the surface of the steel sheet to a temperature higher by 30°–120° C. than a melting point of the fluororesin of said fluororesin film; and contact bonding the fluororesin film onto the steel sheet surface between a pair of rolls, while a surface of a roll facing the fluororesin film, in said pair of rolls, is heated to a temperature lower by 100°–210° C. than the melting point of the fluororesin of the fluororesin film.

2. A method of producing a steel sheet coated with a fluororesin film according to claim 1, wherein a primer comprised of a mixed resin of fluororesin and thermal-resistant resin is applied onto the surface of the steel sheet and dried, prior to contact-bonding of the fluororesin film to the steel sheet, the primer having a thickness of 3–15 g/m² after drying.

3. A method of producing a steel sheet coated with a fluororesin film according to claim 1, wherein at least one of the steel sheet surface and the roll surface facing the fluororesin film is heated using induction heating.

4. A method of producing a steel sheet coated with a fluororesin film according to claim 2, wherein at least one of the primer which has been applied to the steel sheet surface and the roll surface facing the fluororesin film is heated using induction heating.

5. A method of producing a steel sheet coated with a fluororesin film according to claim 1, wherein the steel sheet comprises a member selected from the group consisting of galvanized steel sheet, hot dip zinc-5% aluminum alloy plated steel sheet, hot dip galvannealed steel sheet, zinc-nickel alloy plated steel sheet, hot dip aluminum plated steel sheet, hot dip aluminum-silicon alloy plated steel sheet, 55% aluminum-zinc alloy plated steel sheet, and stainless steel sheet.

6. A method of producing a steel sheet coated with a fluororesin film according to claim 5, wherein the thickness of the steel sheet is from about 0.5 to about 1.6 mm.

7. A method of producing a steel sheet coated with a fluororesin film according to claim 1, wherein the fluororesin film comprises a fluororesin containing 2 or more fluorine atoms per 1 molecule unit.

8. A method of producing a steel sheet coated with a fluororesin film according to claim 7, wherein the fluororesin film comprises a member selected from the group consisting of ethylene tetrafluoride-perfluoroalkylvinyl ether copolymer resin, ethylene tetrafluoride-propylene hexafluoride copolymer resin and ethylene tetrafluoride-ethylene copolymer resin.

9. A method of producing a steel sheet coated with a fluororesin film according to claim 7, wherein the thickness of the fluororesin film is from 10 to 100 μm.

10. A method of producing a steel sheet coated with a fluororesin film according to claim 2, wherein the primer comprises a mixed resin comprising a fluororesin powder and a thermal-resistant resin and wherein:

A) the fluororesin powder comprises a member selected from the group consisting of polyethylene tetrafluoride, ethylene tetrafluoride-perfluoroalkylvinyl ether copolymer resin, ethylene tetrafluoride-propylene hexafluoride copolymer resin, ethylene tetrafluoride-ethylene copolymer resin, chlorotrifluoroethylene, and polyvinylidene fluoride; and B) the thermal-resistant resin comprises a heat-resistant resin comprising a member selected from the group consisting of polyether sulfone, polyphenylene sulfide, polyimide, polyamideimide, epoxy resin, silicone resin and phenolic resin.

11. A method of producing a steel sheet coated with a fluororesin film according to claim 10, wherein a mixing ratio of the fluororesin powder to heat-resistant resin is in the range of from 1:99 to 95:5, by weight.

* * * * *